Patented Dec. 15, 1936

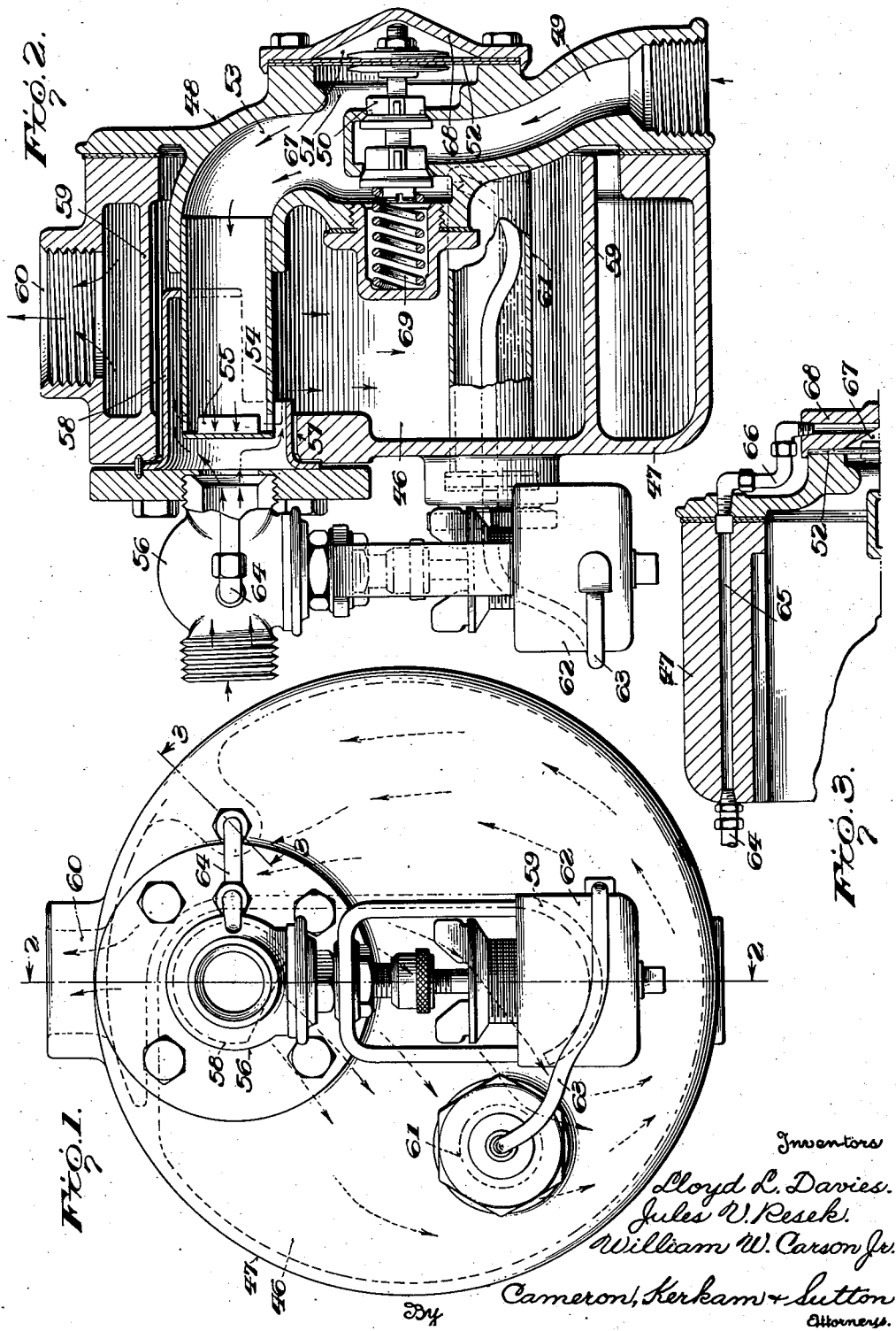

2,064,244

UNITED STATES PATENT OFFICE 2,064,244

FLUID MIXING DEVICE

Lloyd L. Davies, Knoxville, Tenn., Jules V. Resek, Cleveland, Ohio, and William W. Carson, Jr., Knoxville, Tenn., assignors to The Fulton Sylphon Company, Knoxville, Tenn., a corporation of Delaware Original application October 20, 1933, Serial No. 694,500, which in turn is a division of application Serial No. 601,624, March 28, 1932. Divided and this application June 15, 1934, Serial No. 730,814

20 Claims. (Cl. 137—111)

This invention relates to the art of fluid mixing, and more particularly to an apparatus for mixing two or more fluids of different temperatures so as to produce a mixture of said fluids having a substantially constant and uniform predetermined temperature. This application is a division of our application Serial No. 694,500, filed October 20, 1933, which in turn is a division of our application Serial No. 601,624, filed March 28, 1932.

In devices of this general character, as for example water mixers wherein cold water is mixed with and heated by hot water, steam or the like, difficulty has hitherto been encountered in producing a mixture the temperature of which will remain substantially constant irrespective of changes in the temperatures, pressures and rates of flow of the fluids being mixed. Such mixers as are already known perform fairly satisfactorily as long as there are no substantial changes in the pressures and rates of flow of the various fluids supplied to the mixing device, but trouble is often experienced when such changes do occur because of the "hunting" action of the valves which permits alternate slugs of hot and cold fluids to pass through the mixer. Various methods have been suggested for remedying these defects, such as regulating both hot and cold fluid inlet valves from a single thermostat, using a small fixed orifice for one of the inlets and obtaining regulation by a valve in the other inlet, and using a pressure equalizer to maintain the pressures of the fluids supplied equal, but none of these remedies is adequate to produce the desired results under all of the various conditions encountered during practical operation.

It is therefore one of the objects of the present invention to provide a novel and efficient apparatus for mixing a plurality of fluids so as to produce a mixture the temperature of which is uniform and accurately maintained, within narrow limits, at a predetermined standard regardless of the differences and changes in the temperatures, pressures and rates of flow of the fluids being mixed.

Another object is to provide a fluid mixing device of novel construction wherein a plurality of fluids are conducted through a portion of said device in parallel though reversely flowing streams and thoroughly mixed by reversing the flow of a portion of said fluids so as to produce a great turbulence.

Another object is to provide a fluid mixing device of the character described which is simple and rugged in structure and has a minimum of moving parts, is economical to manufacture and maintain, and is efficient and reliable for the purpose intended.

These and other objects will appear more fully from a consideration of the detailed description of the invention which follows. Although only one embodiment of the present invention is described and illustrated in the accompanying drawing, it is to be expressly understood that these drawings are for the purpose of illustration only and are not to be construed as a definition of the limits of the invention, reference being had for this purpose to the appended claims.

In the drawing, wherein like reference characters indicate like parts throughout the several views:

Fig. 1 is an end view of a fluid mixing device embodying the present invention;

Fig. 2 is a sectional view taken substantially on line 2—2 of Fig. 1, with certain parts shown in full; and Fig. 3 is a fragmentary sectional view taken substantially on line 3—3 of Fig. 1.

Referring now to Figs. 1, 2, and 3, there is shown therein a fluid mixing device to which are supplied a hot and a cold fluid and within which said fluids are so mixed as to produce a fluid mixture the temperature of which is maintained, within narrow limits, substantially uniform and constant at a predetermined standard regardless of the initial temperatures and pressures and the rate of flow of the mixed fluid. Although each fluid supply line is provided with its individual valve, regulation of the supply of both fluids is controlled basically by a single thermostat which is adapted to actuate the valve in one of the supply lines, the other valve being controlled by the differential in pressure between the fluid in the line controlled by the thermostatically operated valve and the fluid mixture within the mixing device. Suitable means are also provided for always maintaining this differential equal to or greater than a predetermined minimum value in favor of the pressure of the fluid in the thermostatically controlled supply line, thereby making possible automatic compensation of the basic control for variations in the pressures and rates of flow of the hot and cold fluids.

The specific form of apparatus disclosed in Figs. 1 and 2, as exemplary of the present invention, comprises a water mixer of the type wherein cold water and a hot fluid, such as hot water or steam, are supplied to a mixing chamber wherein they are thoroughly mixed and the cold water is heated, the resulting mixture being maintained at a substantially constant and uniform temperature, the latter being determined by the use to which the mixture is put.

As shown, the mixing chamber 46 is provided by a substantially cylindrical casing 47 open at one end (the right end as viewed in Fig. 2), which opening is adapted to be closed by a combined fluid supply conduit and valve structure indicated generally at 48. This combined conduit and valve structure 48 is provided with a cold fluid inlet passageway 49, and a balanced double disk valve member 50 past which the cold fluid flows into a valve chamber 51, one side of which is formed by a flexible diaphragm 52, and thence through an elbow-shaped passageway 53 into a tube 54. Tube 54 is supported by structure 48 within the upper portion of mixing chamber 46 and extends transversely substantially the width of said mixing chamber, being provided adjacent its inner end wall with a plurality of peripheral outlets 55 through which the flow of the cold fluid is directed into the stream of the hot fluid. The hot fluid is in turn supplied from any suitable source to a valve 56 and thence, through a suitable opening 57 in the closed end wall of casing 47, to mixing chamber 46. Mounted in opening 57, and secured in any suitable manner to casing 47, is an outer tube or shield member 58 which almost entirely surrounds tube 54 and forms therewith the equivalent of a mixing nozzle. The lower portion of outer tube or shield member 58 is cut away on a plane angularly disposed to the horizontal, as indicated in the broken lines in Fig. 1, so as to provide an opening through which the turbulently mixed fluids may be directed downward into mixing chamber 46 at an angle to the vertical as viewed in the drawing. To facilitate mixing and to insure higher velocity of the mixed fluid directly over the bulb 61, there is provided, preferably formed integral with casing 47, a suitably shaped baffle plate 59, the general shape of which is best shown in Fig. 1 in broken lines. The discharge opening 60 from mixing chamber 46 may be located at any suitable point, preferably at the top, of the periphery of casing 47. The direction of flow of the mixed fluid is shown by the arrow of Fig. 1.

The supply of both the hot and cold fluids to mixing nozzle 54, 58 is controlled basically by a single thermostat, exposed to the temperature of the fluid mixture within chamber 46, which is suitably connected in a known manner so as to control the movements of valve 56 of the hot fluid supply line. As shown, a thermostat bulb 61, partially filled with a liquid having a low boiling point, is suitably supported, as by a suitable gland in the wall of mixing chamber 46, at a point within the mixing chamber intermediate the mixing nozzle and outlet conduit 60, the interior of bulb 61 being connected through a tube 63 having flexible portions if desired to the interior of a suitable expansible and contractible member housed within a casing 62. A movable wall of the expansible and contractible member housed in casing 62 is secured to the valve stem of valve 56. When the low boiling point liquid within bulb 61 is vaporized by an increase in temperature of the surrounding fluid mixture within mixing chamber 46, the vapor enters the open end of tube 63, passes into the expansible and contractible member, and by expansion of the latter moves the valve stem so as to close valve 56. Upon a decrease in the vapor pressure, due to a lowering of the temperature of the fluid mixture in mixing chamber 46, the expansible and contractible member contracts and reopens valve 56. Since this type of valve operating mechanism is old and well known in the art, it is unnecessary to describe it in further detail, and it will be understood that any other equivalent mechanism may be substituted for the specific form shown.

It will be noted in Fig. 2 that the end of the tube 63 within bulb 61 is curved upwardly so that its open end is located above the level of the liquid within the bulb. In thermostatically operated valve devices of this character previously employed, the open end of the tube has been placed below the level of the liquid in the bulb so that a change in temperature forces the liquid itself into, or withdraws it from, the tube and the interior of the expansible and contractible member, this resulting in the valve being opened or closed very rapidly, and, because of its high sensitivity, rendering the valve subject to a "hunting" form of operation. By locating the open end of tube 63, in accordance with the present invention, above the level of the liquid in bulb 61, only vapor enters said tube and the expansible and contractible member, the result being that although the intial movement of the valve occurs just as positively and quickly as in the devices hitherto known, the continued movement of the valve to its open or closed position takes place more slowly, thus overcoming the tendency to "hunt". In order to insure that the thermostat is properly installed within mixing chamber 61 with the open end of tube 63 up, the outer end of bulb 61 or tube 63 may be provided with a suitable marking to indicate the position of the end of said tube within said bulb.

With this construction, it is evident that the movements of valve 56, which controls the supply of hot fluid to mixing nozzle and mixing chamber 46, will vary in proportion to changes in the temperature of the fluid mixture surrounding bulb 61 of the thermostat. However, in order that the temperature of the fluid mixture within said chamber may be maintained substantially constant, within narrow limits, the supply of cold fluid to the mixing nozzle must also be controlled so as to result in this desired mixture temperature. Novel means have therefore been provided for controlling valve 50 in the cold fluid supply line without the necessity for another thermostatic element.

As shown in Fig. 2, the valve 50 for the cold fluid is normally urged toward closed position by a coil spring 69 and is connected to a flexible diaphragm 52, which may be made of rubber or any other suitable flexible material, said diaphragm in turn being secured in place across the open top of the casing of valve 50 by a suitable cover plate or cap 68 which forms a pressure chamber 67 with diaphragm 52. Pressure chamber 67 is connected by a suitable tube or conduit 64, passage 65 in casing 47 and tube or conduit 66 to the supply side of valve 56 in the hot fluid line, and is hence subject to the pressure of the hot fluid on the supply side of valve 56, a pressure which is somewhat higher than that on the discharge side of the hot fluid valve and in mixing chamber 46. The pressure on the under side of diaphragm 52 is that of the cold fluid within the casing of valve 50 on the discharge side thereof, which pressure, neglecting the loss in conduit 53, 54 to which the outlet from valve 50 is connected, is substantially the same as that of the mixture within the mixing nozzle and mixing chamber 46. Therefore, since spring 69 exerts a substantially constant force, and since the difference between the pressures on the unbalanced areas of the valve 50 is comparatively small, the position of valve 50 may be said to be dependent upon the differential of pressure between the fluid on the two sides of diaphragm 52; that is, the difference between the pressure of the hot fluid on the supply side of thermostatically operated valve 56 and the pressure of the fluid mixture within mixing chamber 46. It is preferable that the force exerted by spring 69 be so adjusted that this differential may never decrease below a predetermined amount, approximately three pounds in a water mixer of the type illustrated, although it will be understood that this differential may increase above this predetermined minimum under various conditions of pressure in the hot and cold fluid supply lines.

The manner of operation of the mixing device just described, which is exemplary of the novel method provided by the present invention, may be summarized as follows: Assuming that both hot and cold fluids are being supplied to mixing nozzle 54, 58 and thence to mixing chamber 46 in the proper proportions to maintain the mixture at the desired predetermined temperature, and that the mixture is being withdrawn from mixing chamber 46 through outlet 60, any slight change in the temperature of the mixture due to a change in the temperature, pressure or rate of flow of either of the fluids being supplied promptly affects the thermostat so as to slightly open or close the hot fluid valve 56.

Assuming that the change in temperature of the mixture is a slight increase, the effect of the thermostat is to slightly close valve 56 so as to decrease the amount of hot fluid entering the mixing nozzle, which closing of the valve simultaneously slightly decreases the pressure of the mixture. The effect of this pressure change is to increase the differential of pressure in favor of the pressure exerted on the outer side of diaphragm 52 so as to move valve 50 toward open position and thereby further open the cold fluid valve so that more cold fluid may flow to the mixing chamber to bring the temperature of the mixture back down to the predetermined standard. On the other hand, assuming that the change in temperature of the mixture is a slight decrease below the standard, the thermostat operates to further open the hot fluid valve 56, which opening of the valve simultaneously increases the pressure of the fluid mixture. The differential of pressure affecting diaphragm 52 is accordingly decreased and valve 50 is moved toward closed position, thereby decreasing the amount of cold fluid supplied to the mixing chamber, which in turn permits the temperature of the mixture to increase again to the standard.

The construction just described also permits automatic compensation of the basic control afforded by the thermostat, whenever the supply pressures or rates of flow of the hot and cold fluids vary. For example, assuming that the supply pressure in the hot fluid line increases, which would in turn tend to increase the amount of hot fluid supplied to the mixing chamber in proportion to the cold fluid, this increase in pressure is instantaneously transmitted to pressure chamber 67 on outer side of diaphragm 52 with the result that the cold fluid valve is opened slightly so as to admit a greater quantity of cold fluid to the mixing chamber to balance the increased supply of hot fluid. If, on the other hand, the cold fluid supply pressure should increase, the pressure exerted on the inner side of diaphragm 52 would also instantaneously increase, thereby decreasing the differential of pressure thereon and slightly closing the cold fluid valve to compensate for the increase in pressure so as to maintain the amount of cold fluid supplied substantially constant. Any other variation which may occur in the temperatures, pressures and rates of flow of the fluids will be accompanied by a similar compensation which is effective to maintain the temperature of the fluid mixture substantially constant.

There is thus provided a novel method and apparatus for controlling the mixing of a plurality of fluids in such a manner as to produce a mixture the temperature of which will remain substantially uniform and constant, within narrow limits, at a predetermined figure, regardless of variations in the initial temperatures and pressures or the rate of flow of the mixed fluid which is supplied by the mixer. Accurate and dependable operation is assured by the use of only a single thermostat which controls one of the inlet valves, the other inlet valve being in turn controlled by variations in the pressure of the fluid controlled by the thermostatically operated valve, of the fluid mixture, or both. The novel method and apparatus herein disclosed also provide for automatic compensation of the valve positions, as determined by the basic thermostatic control, in response to variations in the supply pressures and rates of flow of the fluids being mixed.

Furthermore, in order that the structure of the mixing device provided by the present invention may be as simple and compact as possible, a novel form of mixing nozzle has also been provided which, by an abrupt change in the direction of flow of the fluids therethrough, produces a great turbulence and effects a rapid and thorough mixture of the fluids within a relatively constricted space. An improved form of thermostat has also been devised which tends to eliminate the "hunting" action formerly experienced with thermostatically operated valves heretofore known. All of these improvements have been embodied in a method and apparatus for the mixture of fluids which are highly efficient and dependable in practical operation, and capable of results not hitherto obtainable.

It will be obvious that the invention is not limited to the apparatus shown in the drawing, but is capable of a variety of mechanical embodiments. For example, any suitable type of thermostatically operated valve mechanism may be employed for controlling the movements of the hot fluid valve, and other forms of pressure responsive means may be substituted for the specific type of diaphragm described and illustrated in connection with the cold fluid valve. Also, it is obvious that the differential pressure operated valve can be used on the hot fluid supply line and an inverted thermostatic valve on the cold fluid line without deviating from the inventive concept. Moreover, although the description has referred to a water mixer in which hot and cold water are the two fluids to be mixed, it is evident that the method and apparatus are equally well adapted for use with other fluids, such as air or steam, as well as water.

Furthermore, some of the various features described may be used separately or in combination with other features within the scope of the invention.

Various other changes, which will now appear to those skilled in the art, may be made in the form, details of construction and arrangement of the parts without departing from the spirit of the invention, and reference is therefore to be had to the appended claims for a definition of the limits of the invention.

What is claimed is:

1. In a device for mixing fluids, a mixing chamber having an outlet near its periphery, means for supplying the fluids to be mixed near the periphery of said chamber and to opposite sides of said chamber in oppositely flowing streams which are concentrically arranged for a portion of their length, means for preventing mixing of said fluids during the flow of one of said fluids across a portion of the width of said chamber, means for changing the direction of flow of said last named fluid and directing it transversely into the stream of the other of said fluids whereby great turbulence is produced, and means in said chamber for compelling all the mixture to traverse said chamber substantially at right angles to said oppositely flowing streams and into adjacency with the peripheral wall of said chamber at the opposite side of said chamber from said outlet.

2. In a device for mixing fluids, a mixing chamber having an open-ended casing, aligned, telescopically-arranged conduits for supplying fluids to be mixed to said chamber one of said conduits extending through the closed bottom of said chamber, and a valve for controlling the flow of one of said fluids through the other of said conduits, the casing of said valve being detachably connected to said mixing chamber casing in such position as to act as a closure for the open end thereof.

3. In a device for mixing fluids, a mixing chamber having a casing open at one end, a fluid supply conduit connected to said chamber through the closed end of said casing, a combined fluid supply conduit and valve structure detachably connected to said casing in such position as to act as a closure for the open end thereof, and means for effecting an intimate mixture of the fluids supplied to said chamber by said supply conduits.

4. In a device for mixing fluids, a mixing chamber having a cylindrical casing open at one end, a fluid supply conduit connected to said chamber through the closed end of said casing, a combined fluid supply conduit and valve structure detachably connected to said casing in such position as to act as a closure for the open end thereof, said last named fluid supply conduit adapted to conduct the flow of the fluid supplied thereby to a point within the stream provided by the fluid supply conduit in the opposite end of said casing, means for directing the flow of fluid from said second named conduit transversely into the flow of the fluid supplied by said first named conduit so as to effect a mixing of fluids with great turbulence, an outlet for the mixed fluid located adjacent the cylindrical periphery of said chamber, and means for directing the flow of said mixed fluid in a path around the periphery of said chamber to said outlet.

5. In a device for mixing fluids, a mixing chamber, a pair of telescopically arranged members, means connected respectively to the opposite ends of said members for supplying said members with the fluids to be mixed, the inner of said members communicating with the outer of said members adjacent the inlet end of the latter and having means for abruptly changing the direction of flow of the fluid flowing in the inner member and directing it at an angle into the fluid flowing in the outer member, means adjacent the end of the outer member for abruptly changing the direction of flow of the mixture of fluids and directing it into said chamber to effect turbulence and a more intimate intermixture thereof, and a partition subdividing said chamber for producing reversely flowing currents of said mixture therein.

6. In a device for mixing fluids, a mixing chamber, a pair of telescopically arranged members, means connected respectively to the opposite ends of said members for supplying said members with the fluids to be mixed, the inner of said members communicating with the outer of said members adjacent the inlet end of the latter and having means for abruptly changing the direction of flow of the fluid flowing in the inner member and directing it at an angle into the fluid flowing in the outer member, means adjacent the end of the outer member for abruptly changing the direction of flow of the mixture of fluids and directing it into said chamber, to effect turbulence and a more intimate intermixture thereof, and means associated with the outlet from the outer member for deflecting the flow of the mixed fluids and compelling all of the mixture to circulate around the major portion of the periphery of said chamber before reaching its outlet to cause further intermixture thereof.

7. In a device for mixing fluids, a mixing chamber, means for supplying the fluids to be mixed to opposite sides of said chamber in oppositely flowing streams which are concentrically arranged for a portion of their length, means for preventing mixing of said fluids during the flow of one of said fluids across a portion of the width of said chamber, means for changing the direction of flow of said last named fluid and directing it transversely into the stream of the other of said fluids whereby great turbulence is produced, and a partition subdividing said chamber and causing traverse of the mixed fluids across said chamber in opposite directions.

8. In a device for mixing fluids, a mixing chamber, means for supplying the fluids to be mixed to opposite sides of said chamber, means for preventing mixing of said fluids during the flow of one of said fluids across a portion of the width of said chamber, means for changing the direction of flow of said last named fluid and directing it into the flow of the other of said fluids whereby great turbulence is produced, means for abruptly changing the direction of flow of the mixing fluids and directing it into said mixing chamber to produce further turbulence, and means in said mixing chamber to produce reversely flowing streams of the mixed fluids therein to produce further turbulence.

9. In a device for mixing fluids, a mixing chamber having a casing open at one end, a fluid supply conduit connected to said chamber at the closed end of said casing, a combined fluid supply conduit and valve structure detachably connected to said casing as a closure for the open end thereof, said last named fluid supply conduit adapted to conduct the fluid supplied thereby to a point within the stream provided by the fluid supply conduit in the opposite end of said casing, and means for directing the flow of fluid from said second named conduit transversely into the fluid supplied by said first named conduit so as to effect a mixing of fluids with great turbulence.

10. In a device for mixing fluids, a mixing chamber having a casing open at one end, a fluid supply conduit connected to said chamber at the closed end of said casing, a combined fluid supply conduit and valve structure detachably connected to said casing as a closure for the open end thereof, said last named fluid supply conduit adapted to conduct the fluid supplied thereby to a point within the stream provided by the fluid supply conduit in the opposite end of said casing, means for directing flow of fluid from said second named conduit transversely into the fluid supplied by said first named conduit so as to effect a mixing of fluids with great turbulence, and means for abruptly changing the direction of flow of the mixture of fluids and directing the same into said chamber so as to produce a further turbulence in said flow.

11. In a device for mixing fluids, a casing forming a mixing chamber and open at one end, a combined fluid supply conduit and valve structure detachably connected to said casing and acting as a closure for the open end thereof, a second fluid supply conduit connected to said chamber through the wall of said casing and providing a stream of fluid flowing in the opposite direction from the stream in said first named conduit, the inner ends of said conduits being in telescopic relationship and the inner of said conduits opening into the outer of said conduits at the inner end of the inner conduit and at an angle to the axes of said conduits whereby the mixture formed in the outer of said conduits flows in the opposite direction from the fluid in the inner conduit.

12. In a device for mixing fluids, a casing forming a mixing chamber and open at one end, a combined fluid supply conduit and valve structure detachably connected to said casing and acting as a closure for the open end thereof, a second fluid supply conduit connected to said chamber through the wall of said casing and providing a stream of fluid flowing in the opposite direction from the stream in said first named conduit, the inner ends of said conduits being in telescopic relationship and the inner of said conduits opening into the outer of said conduits at the inner end of the inner conduit and at an angle to the axes of said conduits whereby the mixture formed in the outer of said conduits flows in the opposite direction from the fluid in the inner conduit, and means at the inner end of the outer of said conduits to abruptly change the direction of flow of said mixture and produce further turbulence.

13. In a device for mixing fluids, a mixing chamber, a fluid supply conduit connected to said chamber at one side thereof, a second fluid supply conduit connected to said mixing chamber at the opposite side thereof, the inner ends of said supply conduits being in telescopic relation and the fluid flowing through said conduits flowing in opposite directions, means of communication between said conduits at the inner end of the inner conduit, means at said inner end of said inner conduit for abruptly changing the direction of flow of fluid in the inner conduit as it flows into the outer conduit, and means in said chamber whereby the mixed fluids must flow substantially around said chamber before reaching the outlet.

14. In a device for mixing fluids, a mixing chamber, a fluid supply conduit connected to said chamber at one side thereof, a second fluid supply conduit connected to said mixing chamber at the opposite side thereof, the inner ends of said supply conduits being in telescopic relation and the fluid flowing through said conduits flowing in opposite directions, means of communication between said conduits at the inner end of the inner conduit, means at said inner end of said inner conduit for abruptly changing the direction of flow of fluid in the inner conduit as it flows into the outer conduit, means at the inner end of the outer conduit for abruptly changing the direction of flow of the mixture in said outer conduit, and means in said chamber whereby the mixed fluids must flow substantially around said chamber before reaching the outlet.

15. In a device for mixing fluids, a casing having a mixing chamber and open at one end, a combined fluid supply conduit and valve structure detachably connected to said casing and acting as a closure for the open end thereof, a diaphragm chamber in said closure member, a diaphragm separating said chamber from said supply conduit, a valve in said supply conduit connected to said diaphragm, a second supply conduit communicating with said mixing chamber, a valve in said second supply conduit, and means for communicating the pressure in said second supply conduit to said diaphragm chamber including a passage in the wall of said mixing chamber and a conduit carried by said closure member and communicating at its opposite ends with said passage and said diaphragm chamber.

16. In a device for mixing fluids, a casing having a mixing chamber and open at one end, a combined fluid supply conduit and valve structure detachably connected to said casing and acting as a closure for the open end thereof, a diaphragm chamber in said closure member, a diaphragm separating said chamber from said supply conduit, a valve in said supply conduit connected to said diaphragm, a second supply conduit communicating with said mixing chamber, a valve in said second supply conduit, and means for communicating the pressure in said second supply conduit to said diaphragm chamber including a passage in the wall of said mixing chamber and a conduit carried by said closure member and communicating at its opposite ends with said passage and said diaphragm chamber, the inner ends of said supply conduits being in telescopic relationship and communicating with each other adjacent the inner end of the inner conduit and said mixing chamber communicating with the outer conduit adjacent the inner end thereof.

17. In a device for mixing fluids, a generally cylindrical mixing chamber, a pair of telescopically arranged conduits projecting into said chamber adjacent the periphery thereof and providing oppositely flowing streams, the inner of said members communicating with the outer of said members adjacent the inner end of the inner member and having means for abruptly changing the direction of flow of the fluid flowing from the inner member to the outer member and said outer member communicating with said mixing chamber through an aperture angularly disposed with respect to the axis of said mixing chamber, and means in said mixing chamber causing the mixed fluids to flow around said mixing chamber to reach the outlet thereof, whereby great turbulence is produced.

18. In a device for mixing fluids, a casing having a mixing chamber and open at one end, a combined fluid supply conduit and valve structure detachably connected to said casing and acting as a closure for the open end thereof, a diaphragm chamber in said closure member, a diaphragm separating said chamber from said supply conduit, a valve in said supply conduit connected to said diaphragm, a second supply conduit communicating with said mixing chamber, a valve in said second supply conduit, and means for communicating the pressure in said second supply conduit to said diaphragm chamber carried by said casing.

19. In a device for mixing fluids, a casing having a mixing chamber and open at one end, a closure member for said casing, a diaphragm chamber in said closure member, a fluid supply conduit in said closure member, a diaphragm separating said last named chamber from said supply conduit, a valve in said supply conduit operatively connected to said diaphragm, a second supply conduit communicating with said mixing chamber, a valve in said second supply conduit, and means for communicating the pressure in said second supply conduit to said diaphragm chamber, whereby said first named valve is operated in conformity with the differential of pressure existing between said supply conduits.

20. In a device for mixing fluids, a casing having a mixing chamber and open at one end, a closure member for said casing, a diaphragm chamber in said closure member, a fluid supply conduit in said closure member, a diaphragm separating said last named chamber from said supply conduit, a valve in said supply conduit operatively connected to said diaphragm, a second supply conduit communicating with said mixing chamber, a valve in said second supply conduit, and means for communicating the pressure in said second supply conduit to said diaphragm chamber, whereby said first named valve is operated in conformity with the differential of pressure existing between said supply conduits.

LLOYD L. DAVIES.
JULES V. RESEK.
WILLIAM W. CARSON, Jr.